United States Patent [19]
Kiliz et al.

[11] Patent Number: 6,024,038
[45] Date of Patent: Feb. 15, 2000

[54] SIDE THRUSTER FOR SMALL BOATS

[75] Inventors: Robert L. Kiliz, Sumner; Michael J. Devie, Kent, both of Wash.

[73] Assignee: Timing Systems, Inc., Kent, Wash.

[21] Appl. No.: 09/173,327

[22] Filed: Oct. 15, 1998

[51] Int. Cl.$^7$ .................................................. B63H 25/46
[52] U.S. Cl. ........................ 114/151; 440/40; 137/625.43
[58] Field of Search .................. 137/625.43, 625.44; 114/150, 151, 144 R; 440/38, 39, 40

[56] References Cited

U.S. PATENT DOCUMENTS

| | | | |
|---|---|---|---|
| 2,508,399 | 5/1950 | Kendrick | 137/625.43 |
| 3,228,653 | 1/1966 | Trimmer | 137/625.43 |
| 3,675,611 | 7/1972 | Glass | 114/151 |
| 4,807,552 | 2/1989 | Fowler | 114/151 |

*Primary Examiner*—Ed Swinehart
*Attorney, Agent, or Firm*—Delbert J. Barnard

[57] ABSTRACT

A side thruster comprises a valve, a first water passageway, a second water passageway, a third passageway, a fourth passageway and a pump having an inlet and an outlet. The valve housing includes a first, second, third and fourth ports and a two-position barrier situated within the housing. When in the first position, the barrier connects the first port with the second port and the third port with the fourth port. When in the second position, the barrier connects the second port with the third port and the fourth port with the first port. The first passageway extends between the first port and a first side opening on a first side of the boat. The second passageway extends between the third port and a second side opening on a second side of the boat. The third water passageway extends between the second port and the pump outlet. The fourth water passageway extends between the pump inlet and the fourth port. When the barrier is moved to its first position, the pump draws water from the second side opening and discharges the water through the first side opening. Conversely, when the barrier is moved to its second position, the pump draws water from the first side opening and discharges the water through the second side opening.

20 Claims, 3 Drawing Sheets

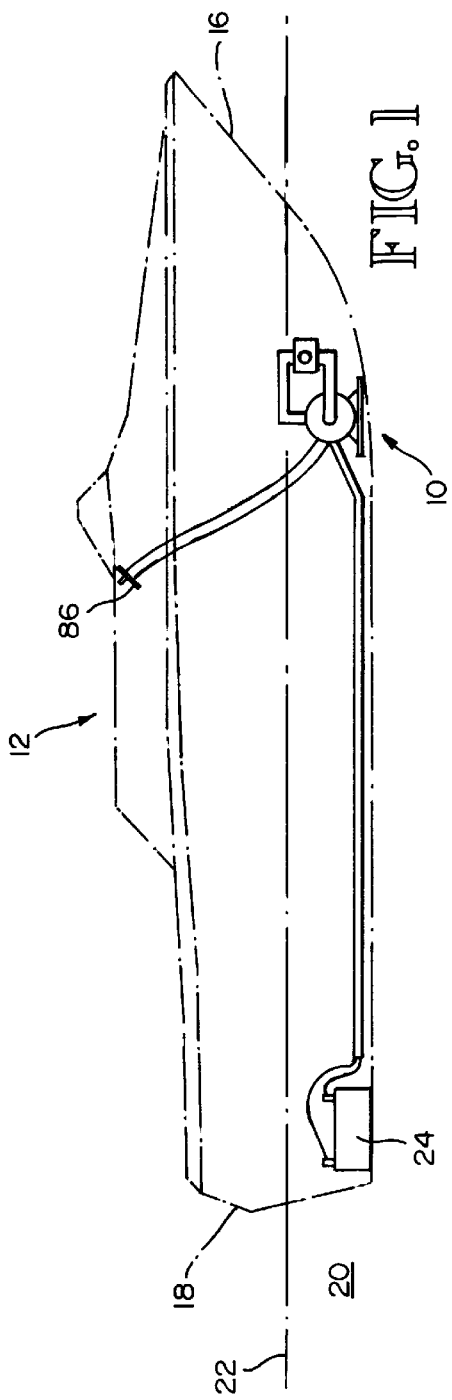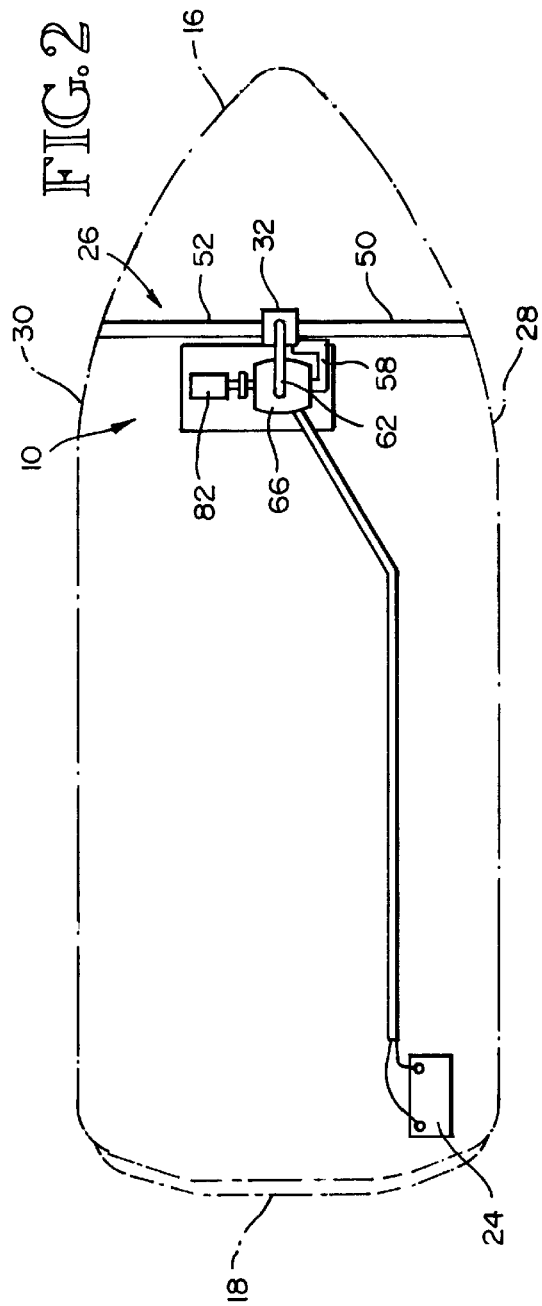

6,024,038

SIDE THRUSTER FOR SMALL BOATS

CROSS-REFERENCE TO RELATED APPLICATION

TECHNICAL FIELD

The present invention relates generally to a maneuvering system for small boats and more specifically to a side thruster for small boats.

BACKGROUND OF THE INVENTION

The popularity of small boats has resulted in congestion on the waterways, especially near docking and mooring areas. In these areas, a small boat must maneuver with precision so that the boat does not unnecessarily cause damage to itself, other boats, the dock, or any other physical structure. Generally, small boats are maneuvered by a propulsion system in the rear of the boat. With this type of propulsion system, the stem pivots in one direction while the bow moves in the opposite direction. Therefore, one must be very skillful at operating the boat so that neither the stem nor the bow causes accidental damage.

Generally, in order to improve the maneuvering of boats, an auxiliary maneuvering system is used. A typical auxiliary maneuvering system includes a propeller installed in a tube transverse to the bow. The propeller provides thrust to the bow by moving a large volume of water at low velocity out one end of the tube, causing the bow to move in the direction opposite from this water flow. To get a sufficient volume of water, the typical diameter of the tube is six inches or greater. For small boats, tubing with this diameter is impractical because there is not sufficient hull surface area below the water line for a six inch diameter inlet and outlet opening.

Several auxiliary maneuvering systems have been proposed for small boats. Examples of such systems are disclosed in the following patents: U.S. Pat. No. 4,056,073 to Dashew et al., U.S. Pat. No. 4,265,192 to Dunn, and U.S. Pat. No. 4,807,552 to Fowler. However, these systems tend to have complicated valve arrangements which are expensive, have a separate intake for water, have water outlets located above the water, and are usually considered permanent systems, thus, not easily portable. What is needed is an uncomplicated auxiliary maneuvering system that is easily portable so that it can be installed and removed from a small boat relatively inexpensively and efficiently.

DISCLOSURE OF THE INVENTION

The present invention is directed to a side thruster for a boat that satisfies this need for an uncomplicated auxiliary maneuvering system that is easily portable so that it can be installed and removed from a small boat relatively inexpensively and efficiently. The side thruster comprises a valve, a first water passageway, a second water passageway, a third passageway, a fourth passageway and a pump having an inlet and an outlet. The valve housing includes a first, second, third and fourth port and a two-position barrier situated within the housing. When in the first position, the barrier connects the first port with the second port and the third port with the fourth port. When in the second position, the barrier connects the second port with the third port and the fourth port with the first port.

The first passageway extends between the first port and a first side opening on a first side of the boat. The second passageway extends between the third port and a second side opening on a second side of the boat. The third water passageway extends between the second port and the pump outlet. The fourth water passageway extends between the pump inlet and the fourth port. When the barrier is moved to its first position, the pump draws water from the second side opening and discharges the water through the first side opening. Conversely, when the barrier is moved to its second position, the pump draws water from the first side opening and discharges the water through the second side opening. These side openings may be located on a bow of the boat.

The barrier in the valve may be controlled using a valve motor having its controls in a cockpit on the boat or it may be controlled manually. The pump also may have a pump associated with it that is remotely controlled from the cockpit on the boat. Based on the specifications for the pump, the water is forced out through the side openings at a velocity substantially faster than prior art propellor based systems. Therefore, the diameter of the passageways can be on the order of one and one-half inches to three inches compared to six or more inches for propellor based systems. In addition, the side openings in the present invention function as water intakes, thus eliminating the need for a separate water intake opening. Therefore, there is no additional concern that an additional intake may malfunction or become clogged.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 1 is a cut-away side view of a boat showing the preferred embodiment of an auxiliary maneuvering system of the present invention;

FIG. 2 is a top view of a boat showing the placement of the auxiliary maneuvering system;

BEST MODE FOR CARRYING OUT THE INVENTION

Figure 3A:
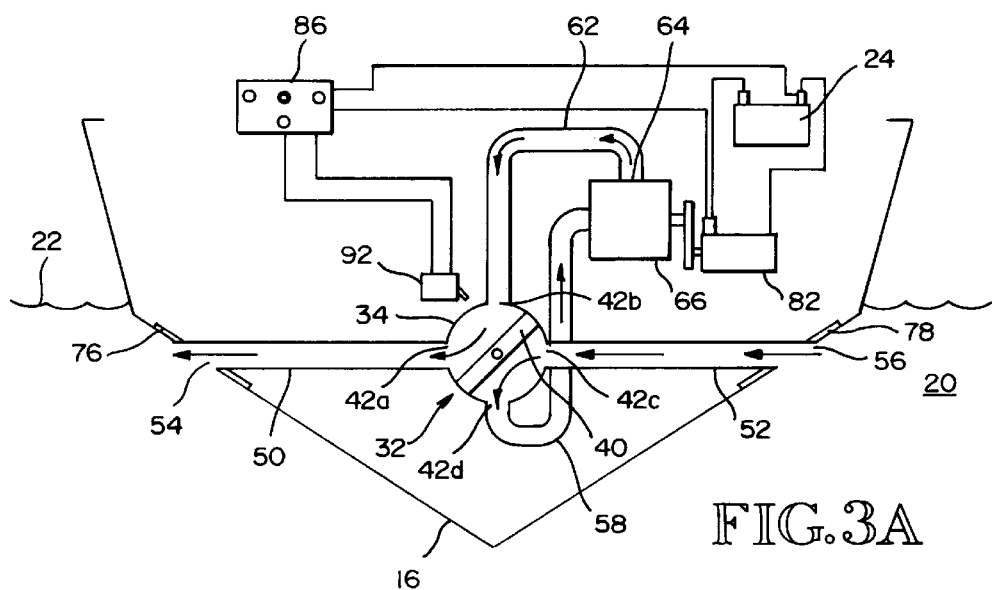
FIG. 3A is a cross-sectional front view of the boat taken substantially along line 3—3 of FIG. 1 showing the barrier in its first position.

Referring now to the drawings, FIG. 1. shows an auxiliary maneuvering system, generally designated 10, for a small boat 12. The boat 12 has the usual hull 14 having a bow 16 and a stem 18. The hull 14 is partially submerged in water 20 and floats at the water line 22. The auxiliary maneuvering system 10 is located in the bow 16 with connections to a battery 24 generally located in the stem 18 of the boat 12 for providing power to the maneuvering system 10.

Now referring to FIG. 2, auxiliary maneuvering system 10 includes a substantially horizontal passageway 26, a rotary crossover valve 32, a pump 66, a third or pump outlet passageway 62, a fourth or pump inlet passageway 58 and a motor 82. The horizontal passageway 26 extends from the port 28 to the starboard 30 with the rotary crossover valve 32 located approximately midway in the passageway 26 dividing the passageway 26 into a first or port passageway 50 and a second or starboard passageway 52. Preferably, passageways 50,52,58,62 are constructed using standard plastic tubing with a diameter between one and one-half inch to around three inches. In preferred form, a diameter of two inches is used.

Figure 3B:
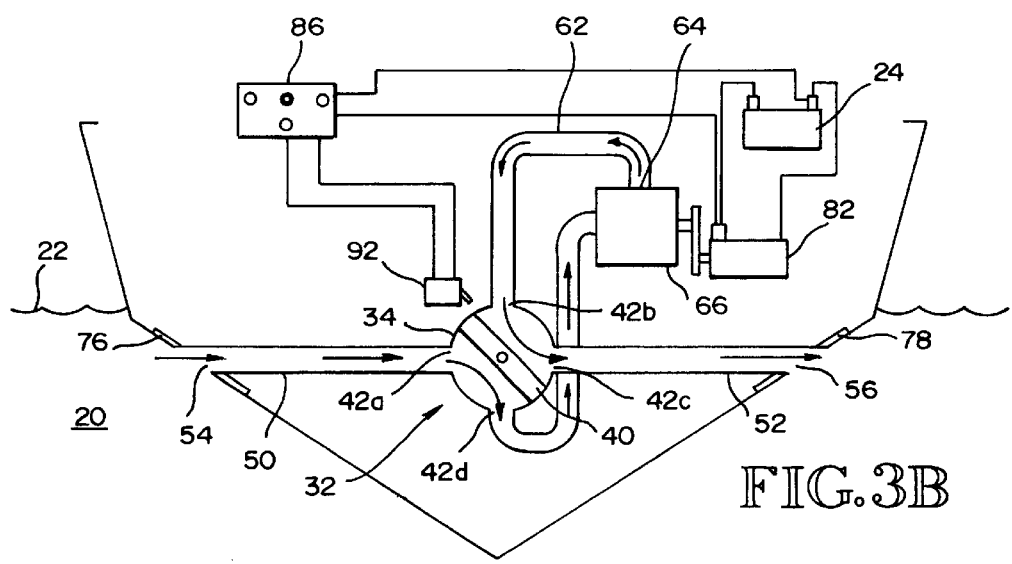
FIG. 3B is a cross-sectional front view of the boat taken substantially along line 3—3 of FIG. 1 showing the barrier in its second position.

Now referring to FIGS. 3A and 3B, the rotary crossover valve 32 can be more clearly described. The rotary crossover valve 32 includes a housing 34, end plates 36, 38 (not shown), and a two position barrier 40, such as a vane. An example of a suitable rotary crossover value is disclosed in U.S. Pat. No. 3,191,628 to Kirkwood et al. The housing 34 is substantially cylindrical with the end plates 36, 38, placed on each end. The vane 40 is movable between two positions 68, 70 either manually or by motor. In preferred form, the vane 40 is positioned using a remote control unit 86 located in the cockpit 88 that selectively moves the vane 40 by using a solenoid 90 driven by a valve motor 92.

The housing 34 has four ports 42A, 44B, 46C, 48D. The first port 42A connects thru the port passageway 50 to a port opening 54. The third port 46C connects thru the starboard passageway 52 to a starboard opening 56. Both of these openings 54, 56 are below the water line 22 and each has a plastic fitting 76, 78 encircling the respective opening 54, 56 that can be capped, thus preventing the inflow of water when the auxiliary maneuvering system 10 is removed.

The second and fourth ports 44B, 48D connect to a pump 66. In preferred form, the pump 66 is a centrifugal pump, which is driven by a high speed electric or hydraulic motor 82. The second port 44B connects thru a pump outlet passageway 62 to a pump outlet opening 64. The fourth port 48D connects thru a pump inlet passageway 58 to a pump inlet opening 60.

As shown in FIG. 3A, when the vane 40 is in the first position 68, the pump 66 draws the water 20 in through the starboard opening 56 through the starboard passageway 52 to the pump inlet opening 60. The pump 66 then forces the water at a high velocity out the outlet opening 64 through the outlet passageway 62 and through the port opening 54. The force of the water flow through the port opening 54 results in the bow 16 of the boat 12 moving in a starboard direction, as designated by the arrows pointing right from the bow 16.

Conversely, as shown in FIG. 3B, when the vane 40 is in the second position 70, the pump 66 draws the water 20 in through the port opening 54 through the port passageway 50 to the pump inlet opening 60. The pump 66 then forces the water at a high velocity out the outlet opening 64 through the outlet passageway 62 and through the starboard opening 56. The force of the water flow through the starboard opening 56 results in the bow 16 of the boat 12 moving in a port direction, as designated by the arrows pointing left from the bow 16.

Because force is proportional to the square of the water velocity ($F = \frac{1}{2} mv^2$), if the velocity is tripled, the diameter of the passageway ways 50, 52, 58, 62 can be decreased from the typical six inches to around two inches. Therefore, boats as small as sixteen feet may effectively utilize this invention.

Figure 4A:
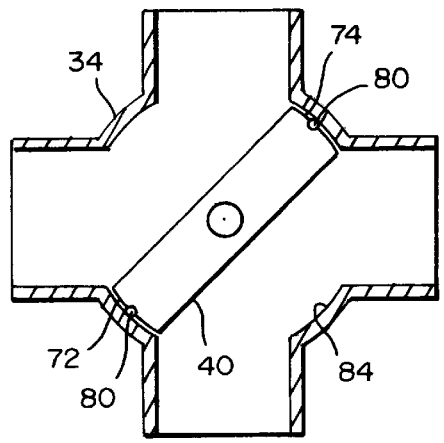
FIG. 4A is a cross-sectional view of the valve taken substantially along line 4—4 of FIG. 3A. showing the barrier in its first position.
Figure 4B:
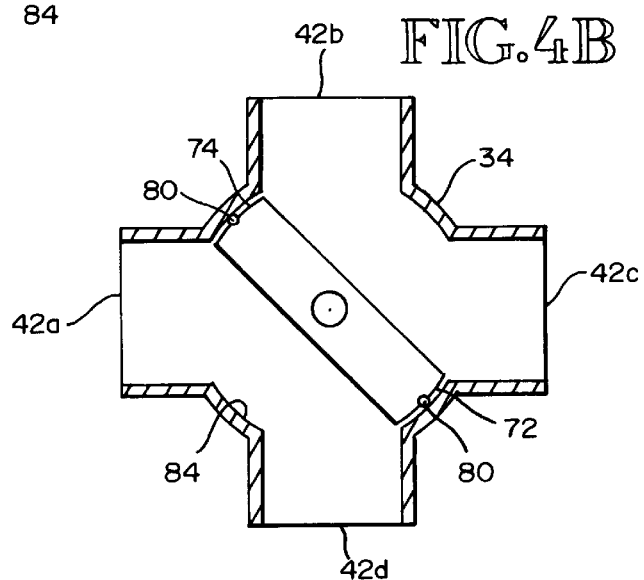
FIG. 4B is a cross-sectional view of the valve taken substantially along line 4—4 of FIG. 3B showing the barrier in its second position.

Now referring to FIGS. 4A and 4B, as one skilled in the art would recognize, the length of the vane 40 must be substantially the diameter of the inner continuous cylindrical surface 84 of the housing 34 and the ends 72, 74 are shaped substantially similar to the inner cylindrical surface 84. The vane 40 includes a sealing means 80 that seals the ends 72, 74 with the inner surface 84.

In preferred form, o-ring type gaskets are used to seal the ends with the inner surface of the housing.

Figure 5:
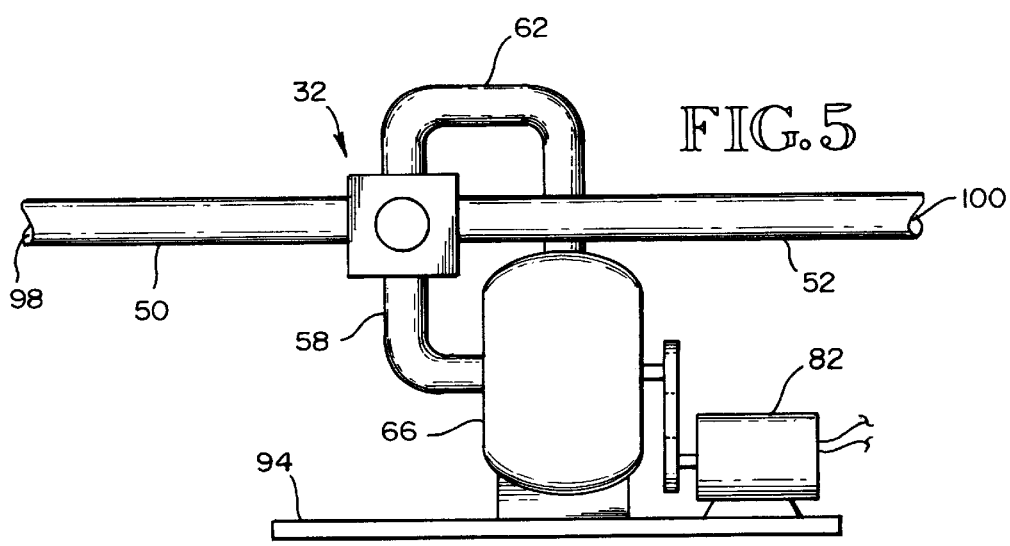
FIG. 5 is a pictorial view of the preferred embodiment of the present invention.

Now referring to FIG. 5, the portability of the embodiment herein described may be shown. Both the pump 66 and the motor 82 are mounted on a base 94, typically constructed from wood. However, other materials may be used to construct the base. The rotary crossover valve 32 and the passageways 50, 52, 58, 62 would be installed as described above. A coupling 96 is placed on the outer ends 98, 100 of both the starboard and port passageways 50, 52. This coupling 96 then fits through the respective starboard and port openings 54, 56.

The previously described versions of the present invention have many advantages, including the portability of the maneuvering system, the smaller passageway diameters, and the elimination of a separate water intake opening that could malfunction or become clogged.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A side thruster for a boat, comprising:
    a valve having a housing including first, second, third and fourth ports, and a two-position barrier in said housing, said barrier when in its first position connecting the first port with the second port and the third port with the fourth port, and when in its second position connecting the second port with the third port and the fourth port with the first port;
    a first water passageway extending between the first port and a first side opening on a first side of the boat;
    a second water passageway extending between the third port and a second side opening on the opposite side of the boat;
    a pump having an inlet and an outlet;
    a third water passageway extending between the second port and the pump outlet; and
    a fourth water passageway extending between the pump inlet and the fourth port,
    whereby the barrier may be moved into its first position and the pump used to pull water in from the second side opening and discharge it out through the first side opening, and the barrier may be moved into its second position and the pump used to pull water in from the first side opening and discharge it out through the second side opening.

2. The side thruster of claim 1, wherein the boat includes a bow and the first side opening is adapled to be mounted on a first side of the bow and the second side opening is adapted to be mounted on the second side of the bow.

3. The side thruster of claim 1, wherein the pump is a centrifuigal pump, a pump motor is associated with the pump for driving the pump, and a valve motor is associated with the valve for moving the barrier between its first and second positions.

4. The side thruster of claim 3, wherein a remote control is provided and is adapted to be mounted in a cockpit of the boat for controlling both the pump motor and the valve motor.

5. The side thruster of claim 4, wherein the boat includes a bow and the first side opening is on a first side of the bow and the second side opening is on the second side of the bow.

6. The side thruster of claim 3, wherein at least the first and second water passageways are of a diameter between substantially about one and one-half inches and substantially about three inches.

7. The side thruster of claim 3, wherein at least the first and second water passageways are of a diameter of substantially about two inches.

8. The side thruster of claim 6, wherein the boat includes a bow and the first side opening is on a first side of the bow and the second side opening is on the second side of the bow.

9. The side thruster of claim 1, wherein at least the first and second water passageways are of a diameter between substantially about one and one-half inches and about three inches.

10. The side thruster of claim 1, wherein at least the first and second water passageways are of a diameter of substantially about two inches.

11. The side thruster of claim 1, wherein the valve is an X-valve and the two-position barrier is a vane in the valve housing that is rotatable from its first position to its second position and from its second position to its first position, said X-valve permitting rotation of the vane from one position to the other while the pump is operating.

12. The side thruster of claim 11, wherein the boat includes a bow and the first side opening is adapted to be mounted on a first side of the bow and the second side opening is adapted to be mounted on the second side of the bow.

13. The side thruster of claim 11, wherein the pump is a centrifugal pump, a pump motor is associated with the pump for driving the pump, and a valve motor is associated with the valve for rotating the vane between its first and second positions.

14. The side thruster of claim 13, wherein a remote control is provided and is adapted to be mounted in a cockpit of the boat for controlling both the pump motor and the valve motor.

15. The side thruster of claim 14, wherein at least the first and second water passageways are of a diameter between substantially about one and one-half inches and substantially about three inches.

16. The side thruster of claim 14, wherein at least the first and second water passageways are of a diameter of substantially about two inches.

17. The side thruster of claim 3, wherein the pump, the pump motor, the valve, the valve motor and at least portions of the passageways together form an assembly that can be installed in and removed from the boat as a unit.

18. The side thruster of claim 17, wherein the boat includes a cockpit and a remote control is provided in the cockpit for controlling both the pump motor and the valve motor.

19. The side thruster of claim 13, wherein the pump, the pump motor, the valve, the valve motor and at least portions of the passageways together form an assembly that can be installed in and removed from the boat as a unit.

20. The side thruster of claim 19, wherein the boat includes a cockpit and a remote control is provided in the cockpit for controlling both the pump motor and the valve motor.

* * * * *

UNITED STATES PATENT AND TRADEMARK OFFICE
CERTIFICATE OF CORRECTION

PATENT NO. : 6,024,038
DATED : February 15, 2000
INVENTOR(S) : Robert L. Kiliz and Michael J. Devine It is certified that error appears in the above-indentified patent and that said Letters Patent is hereby corrected as shown below:

On the cover, under "[54] Inventors:", "Michael J. Divie" should be
-- Michael J. Devine --.
Column 1, lines 20 and 22, "stem" should be -- stern --.
Column 2, lines 61 and 64, "stem" should be -- stern --.
Claim 2, column 4, line 60, "adapled" should be -- adapted --.

Signed and Sealed this

Seventeenth Day of April, 2001

*Attest:*

NICHOLAS P. GODICI

*Attesting Officer*      *Acting Director of the United States Patent and Trademark Office*